(12) United States Patent
Chakraborty et al.

(10) Patent No.: US 10,038,694 B1
(45) Date of Patent: Jul. 31, 2018

(54) SYSTEM AND METHOD FOR SECURITY MODE-BASED AUTHORIZATION FOR DATA MANAGEMENT OPERATIONS IN A MULTI-TENANT PROTECTION STORAGE SYSTEM

(71) Applicant: EMC Corporation, Hopkinton, MA (US)

(72) Inventors: Subhasish Chakraborty, Livermore, CA (US); Hongyu Zhang, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 323 days.

(21) Appl. No.: 15/085,964

(22) Filed: Mar. 30, 2016

(51) Int. Cl.
*H04L 29/06* (2006.01)

(52) U.S. Cl.
CPC .............. *H04L 63/10* (2013.01); *H04L 63/20* (2013.01)

(58) Field of Classification Search
CPC ................................ H04L 63/10; H04L 63/20
USPC .......................................................... 726/1
See application file for complete search history.

(56) References Cited

U.S. PATENT DOCUMENTS

| | | | | |
|---|---|---|---|---|
| 8,352,941 B1 * | 1/2013 | Protopopov | ........ | G06F 9/45558 718/1 |
| 8,612,696 B2 | 12/2013 | Zhu et al. | | |
| 8,635,184 B2 | 1/2014 | Hsu et al. | | |
| 8,762,335 B2 * | 6/2014 | Prahlad | ............... | G06F 21/6218 707/627 |
| 9,251,384 B1 * | 2/2016 | Potlapally | ............... | G06F 21/85 |
| 9,355,060 B1 * | 5/2016 | Barber | ................ | H04L 67/2852 |
| 2005/0108537 A1 * | 5/2005 | Puri | ..................... | G06F 21/6227 713/176 |
| 2011/0022642 A1 * | 1/2011 | deMilo | ............. | G06F 17/30082 707/805 |
| 2012/0166818 A1 * | 6/2012 | Orsini | ..................... | H04L 9/085 713/193 |
| 2013/0007891 A1 * | 1/2013 | Mogaki | ................... | G06F 21/62 726/27 |
| 2014/0059226 A1 * | 2/2014 | Messerli | ............... | G06F 9/5072 709/226 |
| 2014/0289791 A1 * | 9/2014 | Acharya | ............. | H04L 63/0236 726/1 |

(Continued)

FOREIGN PATENT DOCUMENTS

WO          2008008183 A2      1/2008

*Primary Examiner* — Farid Homayounmehr
*Assistant Examiner* — Thanh T Le
(74) *Attorney, Agent, or Firm* — Womble Bond Dickinson (US) LLP

(57) ABSTRACT

According to one embodiment, a request is received from a remote device of a user for performing a data management operation from source data represented by a source data management object (DMO) to destination data represented by a destination DMO. A first security mode associated with a source tenant-unit corresponding to the source DMO and a second security mode associated with a destination tenant-unit corresponding to the destination DMO are determined. It is determined whether the user is a system administrator for a storage system corresponding to the source data or the destination data, and whether the user is a tenant administrator for a tenant associated with the source data or the destination data. It is determined whether the data management operation should be allowed based on the first and second security modes.

24 Claims, 11 Drawing Sheets

(56) References Cited

U.S. PATENT DOCUMENTS

| | | | |
|---|---|---|---|
| 2016/0042194 A1* | 2/2016 | Chakraborty | G06F 3/0605 |
| | | | 726/17 |
| 2016/0269237 A1* | 9/2016 | Higgins | H04L 63/10 |
| 2017/0286465 A1* | 10/2017 | Venkatesh | G06F 17/30327 |
| 2018/0025173 A1* | 1/2018 | Keyes | G06F 21/6218 |
| 2018/0063153 A1* | 3/2018 | Zhu | H04L 41/18 |
| 2018/0069865 A1* | 3/2018 | Rieke | H04L 63/101 |

* cited by examiner

| Tenant Unit ID | Security Mode | Others |
|---|---|---|
| TU1 | Default | ⋮ |
| TU2 | Strict | ⋮ |
| TU3 | Default | ⋮ |
| ⋮ | ⋮ | ⋮ |
| 401 | 402 | 403 |

FIG. 4

| Scenarios/Conditions | Modes | System Admin | Tenant Admin |
|---|---|---|---|
| None of SRC and DEST object belongs a tenant unit (TU) (e.g., SRC, DEST) | Default | Success | Fail |
| | Strict | Success | Fail |
| One of SRC and DEST OBJ belongs to a TU, the other one does not belong to any TU (e.g., SRC → TU1, DEST) | Default | Success with Warning | Fail |
| | Strict | Fail | Fail |
| Both SRC and DEST OBJs belong to the same TU (e.g., SRC → TU1, DEST → TU1) | Default | Success | Success |
| | Strict | Fail | Fail |
| One of SRC and DEST OBJs belongs to TU1, the other one belongs to TU2 (e.g., SRC → TU1, DEST → TU2) | Default | Success with warning | Success with warning |
| | Strict | Fail | Fail |
| One of SRC and DEST OBJs belongs to a TU of tenant T1, the other does not belong to any TU (e.g., SRC → TU1 → T1, DEST) | Default | Success with warning | Fail |
| | Strict | Fail | Fail |
| One of SRC and DEST OBJs belongs to TU1 of tenant T1, the other belongs to TU2 (e.g., SRC → TU1 → T1, DEST → TU2) | Default | Success with warning | Success with warning |
| | Strict | Fail | Fail |
| One OBJ belongs to TU1 of T1 and the other OBJ belongs to TU2 of T1 (e.g., SRC → TU1 → T1, DEST → TU2 → T1) | Default | Success | Success |
| | Strict | Success | Success |
| One OBJ belongs to TU1 of T1 and the other OBJ belongs to TU2 of T2 (e.g., SRC → TU1 → T1, DEST → TU2 → T2) | Default | Fail | N/A |
| | Strict | Fail | N/A |

FIG. 5

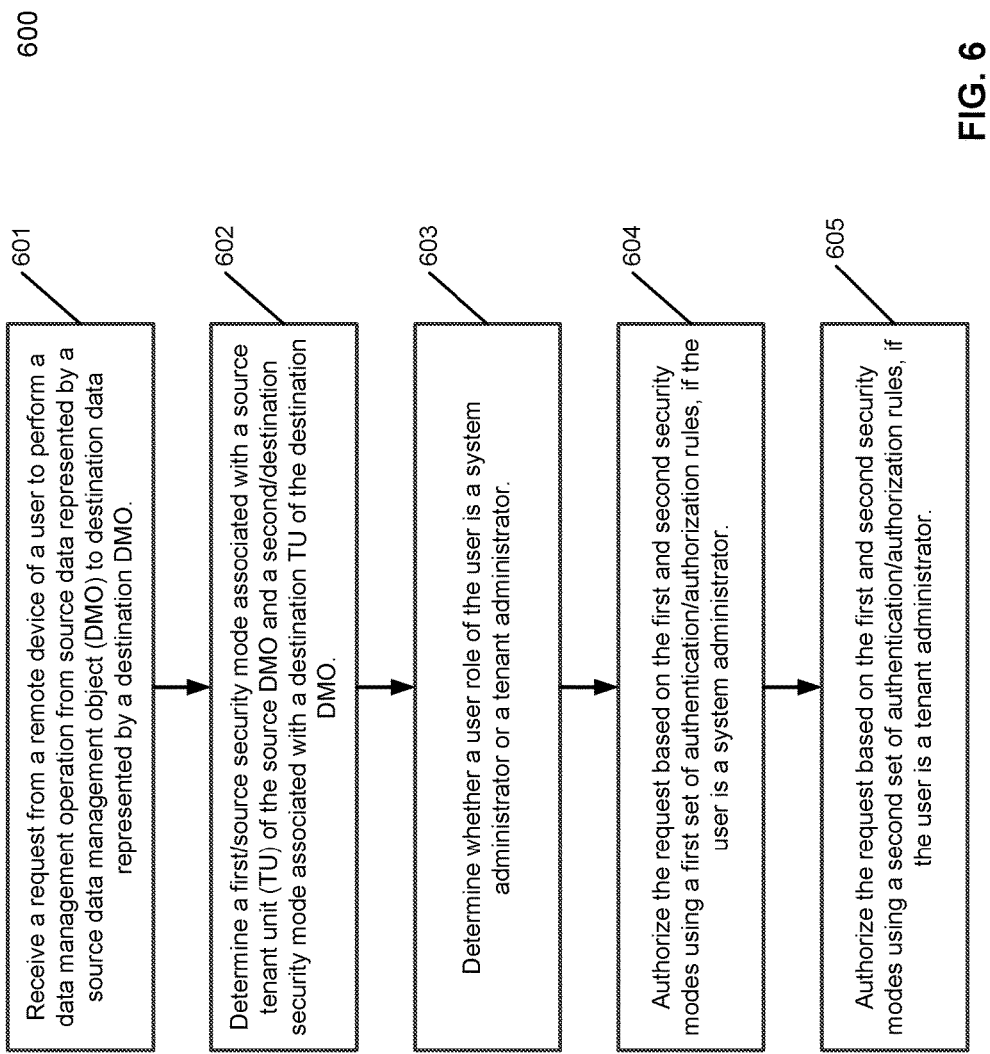

SYSTEM AND METHOD FOR SECURITY MODE-BASED AUTHORIZATION FOR DATA MANAGEMENT OPERATIONS IN A MULTI-TENANT PROTECTION STORAGE SYSTEM

FIELD OF THE INVENTION

Embodiments of the present invention relate generally to multi-tenant protection data storage systems. More particularly, embodiments of the invention relate to security mode-based authorization for data management operations of a multi-tenant protection storage system.

BACKGROUND

Multi-tenancy refers to a technology wherein a single protection storage appliance is deployed to serve multiple customers, each customer using the same storage appliance for their protection storage requirements. A storage system which supports multi-tenancy must satisfy the security and isolation requirements. Here, the "security and isolation requirements" refer to the requirements that each customer's dataset must be secured and isolated from the other customers on the storage appliance. The security and isolation requirements apply to data access. For example, a customer must not be able to read or write to datasets that belong to another customer. The security and isolation requirements can also refer to control access. For example, an administrator of one customer must not be able to perform system configuration, monitoring, etc., of the datasets that belong to another customer. Thus, although the customers may share the same storage appliance for backup, restore, or replicating their datasets, none of the customers can be aware of the presence of other customers in the storage appliance.

As protection storage appliances being deployed by protection storage service providers in multi-tenancy deployment, the same storage appliance may be used to store data of multiple tenants (e.g., customers). In such deployments, it is important to ensure that data management operations are secure from a multi-tenancy perspective, and do not result in one tenant's dataset being inadvertently written to another tenant's data objects.

BRIEF DESCRIPTION OF THE DRAWINGS

Embodiments of the invention are illustrated by way of example and not limitation in the figures of the accompanying drawings in which like references indicate similar elements.

FIG. 4 is a block diagram illustrating an example of an SMT registry namespace cache according to one embodiment of the invention.

FIG. 5 is a block diagram illustrating an example of authorization rules according to one embodiment of the invention.

FIG. 6 is a flow diagram illustrating a process for authorizing data management operations according to one embodiment of the invention.

DETAILED DESCRIPTION

Figure 1A:
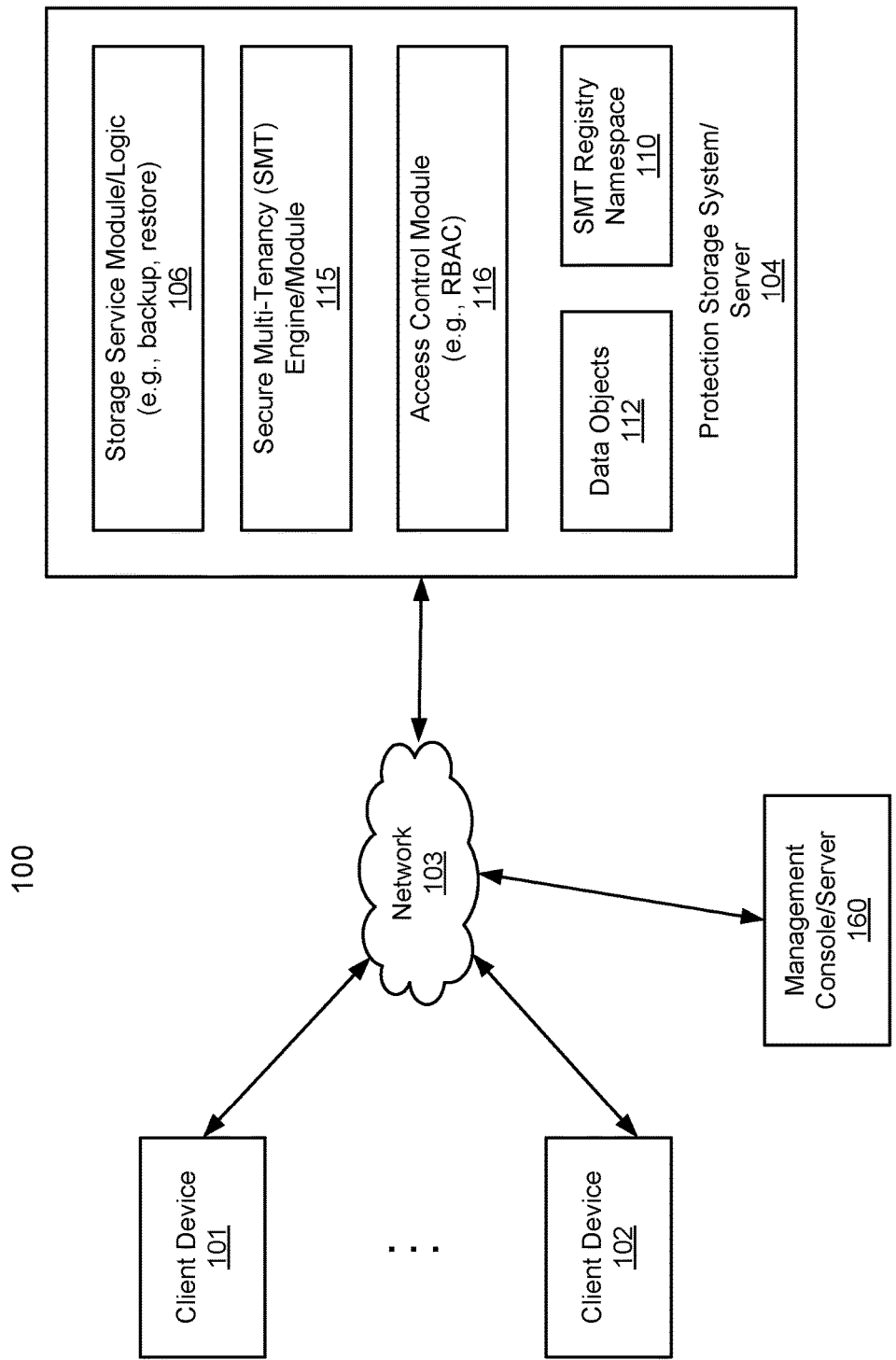
FIGS. 1A-1C are block diagrams illustrating a storage system according to certain embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a security mode, either be a default mode or a strict mode, is utilized to determine whether a data management operation requested by a user should be allowed. A data management operation can be a data transaction or movement from a source data management object (DMO) to a destination DMO. The permission of such a data management operation can also depend on a user role with respect to the DMOs. A user can be a system administrator with respect to a protection storage system or a tenant administrator with respect to a tenant or a tenant-unit of a tenant. A security mode may be associated with a tenant-unit of a tenant. A data management operation may or may not be allowed dependent upon a combination of one or more of whether the DMOs involved are associated with a tenant-unit of a tenant, a security mode associated the tenant-unit, and whether the user is a system administrator or a tenant administrator. A specific set of rules may be utilized for a system administrator and a tenant administrator. With security modes, it is ensured that data management operations are strictly contained within the datasets belonging to a specific tenant in a storage system. It maintains tenant and non-tenant datasets in the same storage system without sacrificing security and isolation aspects of the secure multi-tenancy.

In one embodiment, a user of a remote device initiates a request for performing a data management operation from source data represented by a source DMO to destination data represented by a destination DMO (e.g., Fastcopy™, snapshot, replication). In response, a secure multi-tenancy (SMT) module determines a first security mode derived from a source tenant-unit associated with the source DMO (also referred to as a source security mode) and a second security mode derived from a destination tenant-unit associated with the destination DMO (also referred to as a destination security mode). The SMT module further determines whether the user is a system administrator associated with the storage system or a tenant administrator for a tenant associated with the source data or the destination data. A user can be a tenant administrator for multiple tenant units of a particular tenant. If the user is a system administrator, the SMT module determines whether the data management operation is allowed based on the first and second security modes, using a first set of authorization rules corresponding to a system administrator. If the user is a tenant administrator, the SMT module determines whether the data management operation is allowed based on the first and second security modes, using a second set of authorization rules corresponding to a tenant administrator.

FIG. 1A is a block diagram illustrating a storage system according to one embodiment of the invention. Referring to FIG. 1A, system 100 includes, but is not limited to, one or more client systems 101-102 communicatively coupled to protection storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as protection storage system 104. Network 103 may be any type of networks such as a local area network (LAN), a wide area network (WAN) such as the Internet, a fiber network, a storage network, or a combination thereof, wired or wireless.

Protection storage system 104 may include or represent any type of servers or a cluster of one or more servers (e.g., cloud servers). For example, protection storage system 104 may be a storage server used for various different purposes, such as to provide multiple users or client systems with access to shared data and/or to back up (or restore) data (e.g., mission critical data). Protection storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Protection storage system 104 may further provide storage services via an object-based protocol and Hadoop distributed file system (HDFS) protocol.

In one embodiment, protection storage system 104 includes, but is not limited to, storage service engine 106 (also referred to as service logic, service module, or service unit, which may be implemented in software, hardware, or a combination thereof) to provide storage services (e.g., backup, restore services) to data (e.g., data objects 112) stored in one or more storage units or devices (not shown). Storage service engine 106 may represent any storage service related components configured or adapted to provide storage services (e.g., storage as a service) to a variety of clients using any of the access protocols set forth above. For example, storage service engine 106 may include backup logic and restore logic (not shown). The backup logic is configured to receive and back up data from a client (e.g., clients 101-102) and to store the backup data in a persistent storage device. The restore logic is configured to retrieve and restore backup data from a storage device back to a client (e.g., clients 101-102).

The storage units storing data 112 (not shown) may be implemented locally (e.g., single node operating environment) or remotely (e.g., multi-node operating environment) via interconnect, which may be a bus and/or a network (e.g., a storage network or a network similar to network 103). Storage-units may be logical units represented by protection storage namespaces which aggregate and abstract away from underlying storage hardware (e.g., storage disks). The storage units may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of the storage units may be located remotely accessible over a network.

The data stored in server 104 may be deduplicated by deduplication logic or engine and stored in a form of deduplicated data segments. In response to a data file to be stored in the storage units, according to one embodiment, deduplication logic (not shown) is configured to segment the data file into multiple segments (also referred to as chunks) according to a variety of segmentation policies or rules. The deduplication logic may choose not to store a segment in a storage unit if the segment has been previously stored in the storage unit. In the event that the deduplication logic chooses not to store the segment in the storage unit, it stores metadata enabling the reconstruction of the file using the previously stored segment. As a result, segments of data files are stored in a deduplicated manner. The metadata may be stored in at least some of the storage units, such that files can be accessed independent of another storage unit. Metadata of each storage unit includes enough information to provide access to the files it contains.

In one embodiment, protection storage system 104 further includes a storage manager or storage controller (not shown) configured to manage storage resources of protection storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

According to one embodiment, protection storage system 104 further includes SMT module 115, access control module 116, and SMT registry namespace 110. SMT registry namespace 110 may be stored in a persistent storage device (e.g., hard disks) and implemented in a variety of data structures (e.g., tables, databases). SMT registry namespace 110 includes information defining, describing, and/or configuring each of tenants in a multi-tenancy storage system represented by server 104. A tenant refers to a hierarchical multi-tenancy object. Each tenant object includes information defining, describing, and/or configuring a corresponding tenant. Each tenant object may include or reference to one or more tenant-unit objects. Each of the tenant-unit objects represents a tenant-unit associated with the corresponding tenant. A tenant can have multiple tenant-units. However, no tenant-unit can be related to multiple tenants. A tenant may be an organization or enterprise entity, while a tenant-unit may be a division or business unit within an organization or enterprise entity. A tenant can exist across multiple protection storage systems, and each tenant is identified by a unique tenant identifier such as a universally unique identifier or UUID.

For example, a tenant object may include information defining a group of tenant-units. Similarly, a tenant-unit object may include information specifying who (e.g., user ID, user role, IP address) can configure the corresponding tenant-unit, where (e.g., remote and local IP addresses from which the user logs in), and types of configuration operations (e.g., adding, removing, and/or modifying attributes) that a particular user can perform. The configuration operations may include user assignment/un-assignment of a tenant-unit, group assignment/un-assignment of a tenant-unit, storage unit as signment/un-assignment of a tenant-unit, remote administrative IP address assignment/un-assignment of a tenant-unit, and tenant-unit addition and removal, etc.

In one embodiment, SMT module 115 is configured to provide security and isolation to each tenant. For example, SMT module 115 is configured to allocate tenant-units to tenants by managing various configuration metadata in SMT registry namespace 110. Access control module 116 may be a role-based access control (RBAC) module configured to use configuration metadata in SMT registry namespace 110 to determine whether tenants may perform management operations as set forth above and various other resources at protection storage system 104. Note that SMT module 115 and access control module 116 may be implemented as a single module or engine. In this example as shown in FIG. 1A, client devices 101-102 may be associated with the same or different tenants, same or different tenant-units of a particular tenant. Alternatively, clients 101-102 may not be associated with any tenant or tenant-unit.

According to one embodiment, during the initialization phase (e.g., booting) of protection storage system 104, an SMT registry namespace cache (not shown) may be constructed and loaded into a memory from SMT registry namespace 110. The SMT registry namespace cache may be utilized by SMT module 115 at runtime to determine whether a particular user can perform a data management operation.

According to one embodiment, each of the tenant-units of tenants is associated with a security mode, which may be configured as part of SMT registry namespace 110. A security mode can either be a "default" security mode or a "strict" security mode. The default security mode is the default setting for a tenant-unit until it has been set to a strict mode.

A security mode of a tenant-unit can be set to either a default mode or a strict mode through configuration operations. A security mode can be set to strict if the corresponding tenant-unit belongs to a tenant object. Thus, for a tenant-unit to have a strict security mode, the tenant-unit must belong to a tenant. A data management operation cannot be authorized if the DMOs involved belong to a different tenant. A data management operation cannot be authorized if at least one DMO belongs to a tenant-unit that has a strict security mode, and the other DMO does not have a tenant associated with it.

A security mode may be associated with a tenant-unit of a tenant. A data management operation may or may not be allowed dependent upon one or more of whether the DMOs involved are associated with a tenant or a tenant-unit of a tenant, whether a security mode is specified for each of the tenant-units, and whether the user is a system administrator or a tenant administrator. A specific set of rules may be utilized for a system administrator and a tenant administrator. With different security modes, it is ensured that data management operations are strictly contained within the datasets belonging to a specific tenant in a storage system. It maintains tenant and non-tenant datasets in the same storage system without sacrificing security and isolation aspects of the secure multi-tenancy.

Figure 1B:
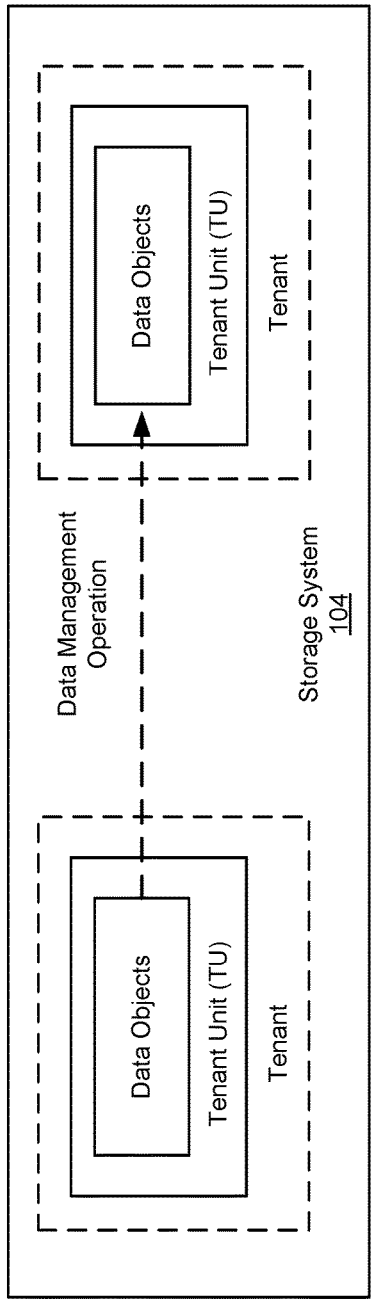
Figure 1C:
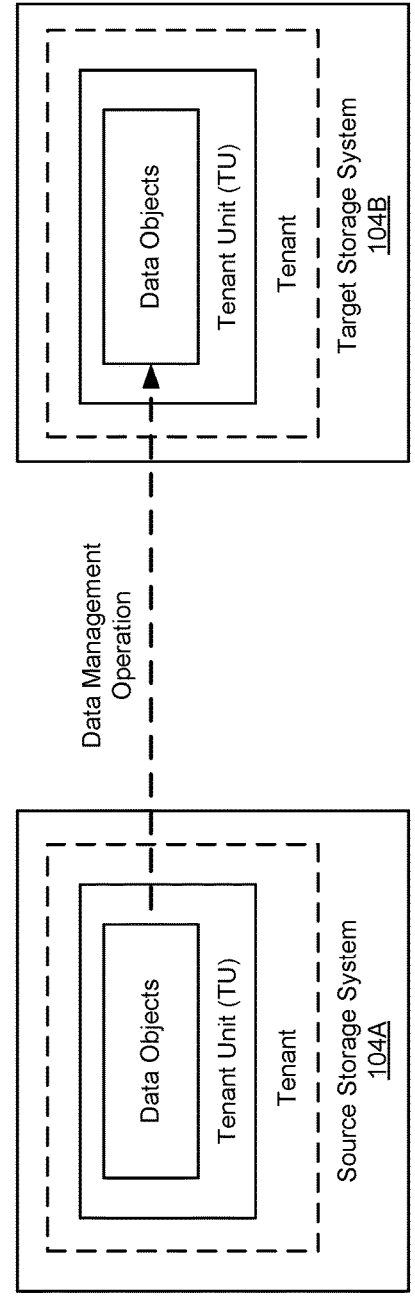

A data management operation can be a management operation from one tenant-unit to another unit within the same storage system as shown in FIG. 1B. Alternatively, a data management operation can be a management operation from one tenant-unit of one storage system to another tenant-unit of another storage system as shown in FIG. 1C. A data management operation can be a copying (e.g., Fastcopy™), taking a snapshot, or replication operation of data management objects.

Figure 2:
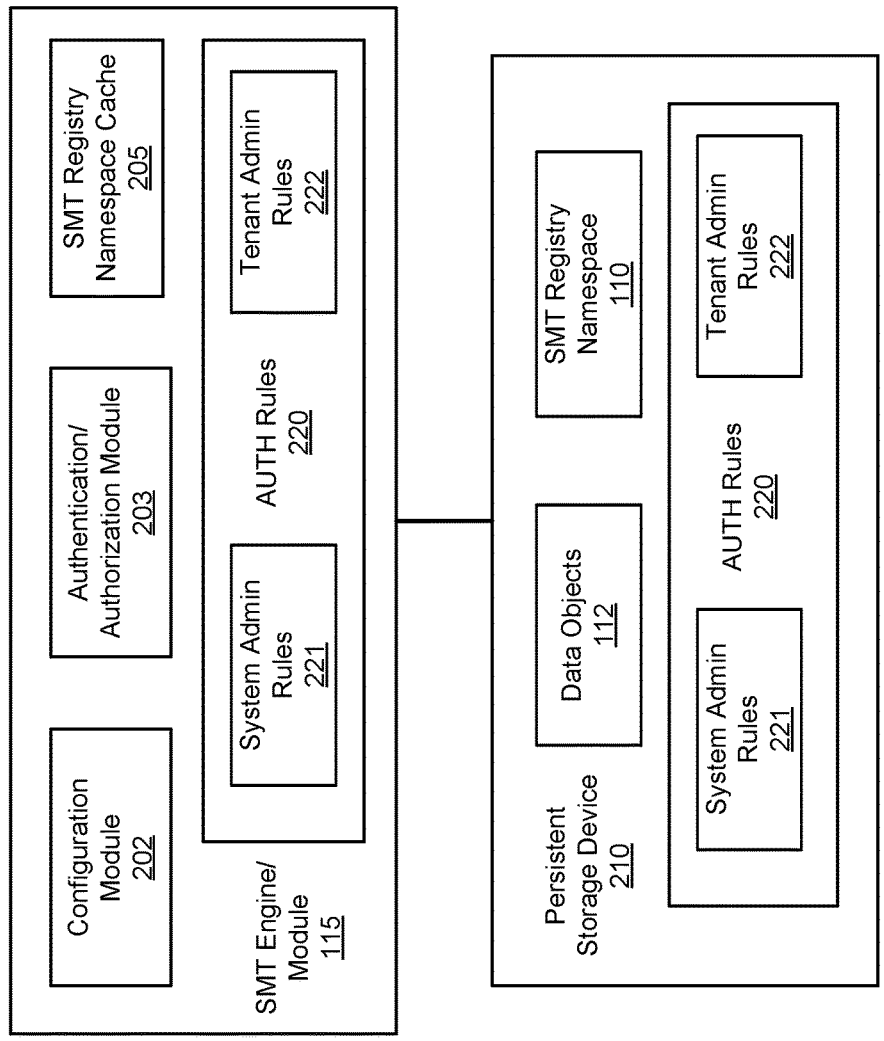
FIG. 2 is a block diagram illustrating an example of a secure multi-tenancy engine according to one embodiment of the invention.

FIG. 2 is a block diagram illustrating an example of a secure multi-tenancy engine according to one embodiment of the invention. Referring to FIG. 2, system 200 includes SMT engine/module 110, which may be implemented in software, hardware, or a combination thereof. In one embodiment, SMT module 115 includes, but is not limited to, configuration module 202, authentication and authorization (AUTH) module 203, and SMT registry namespace cache 205. SMT registry namespace cache 205 may be cached in a system memory from persistent SMT registry namespace 110 stored in persistent storage device 210. Persistent storage device 210 may be a variety of non-volatile storage devices such as hard disks.

In one embodiment, when configuration module 202 receives a request from a remote device of a user (e.g., client device 101 of FIG. 1) to perform a data management operation on data of a particular tenant or a tenant-unit of a tenant stored in SMT registry namespace 110, configuration module 202 communicates with AUTH module 203, for example, via an application programming interface (API) to determine whether the user is entitled or authorized to perform such a data management operation. The request may be received from the remote device via a configuration interface (not shown), which may be a Web interface, an API, a command line interface (CLI), or any other interfaces or communication protocols.

In one embodiment, dependent upon the specific authorization rules, at least a tenant unit ID may be obtained from the request and used as a key to look up in SMT registry namespace cache 205 by AUTH module 203 to determine whether the user is authorized to perform the requested management operation. In one embodiment, SMT registry namespace cache 205 includes multiple entries, each entry mapping a tenant unit ID to a security mode associated with that particular tenant unit.

Once a matching entry has been located, AUTH module 203 retrieves the security mode from the matching entry and determine whether the requested data management operation is allowed based on the security mode and AUTH rules 220. If the user is a system administrator, system administrative rules 221 and the security mode are utilized to determine whether the requested data management operation is allowed. If the user is a tenant administrator, tenant administrative rules 222 and the security mode are utilized to determine whether the requested data management operation is allowed. In one embodiment, SMT registry namespace cache 205 may be constructed from persistent SMT registry namespace 110 and loaded into the memory during an initialization of system 200 (e.g., boot time).

According to one embodiment, each of tenant-units configured in SMT registry namespace 110 may be associated with a security mode. A security mode can be either a default security mode or a strict security mode as described above. When a data management operation is performed from a source DMO to a destination DMO, the security modes of a source tenant-unit associated with the source DMO and a destination tenant-unit associated with the destination DMO are utilized to determine whether the data management operation is allowed. In addition, a user role of a user who requested the data management operation may also be taken into consideration in view of AUTH rules 220. AUTH rules 220 may be stored in persistent storage device 210 and loaded into a memory and accessible by SMT module 115.

In one embodiment, AUTH rules 220 include system administrator rules 221 and tenant administrator rules 222. When a user who requested the data management operation is a system administrator for the storage system, system administrator rules 221 are utilized in determining whether the data management operation should be allowed given the specific security modes associated with the source tenant-unit and/or the destination tenant-unit. Different security modes in view of different ones of system administrator rules 221 and tenant administrator rules 222 may yield a different conclusion or result regarding whether the data management operation should be allowed.

Figure 3:
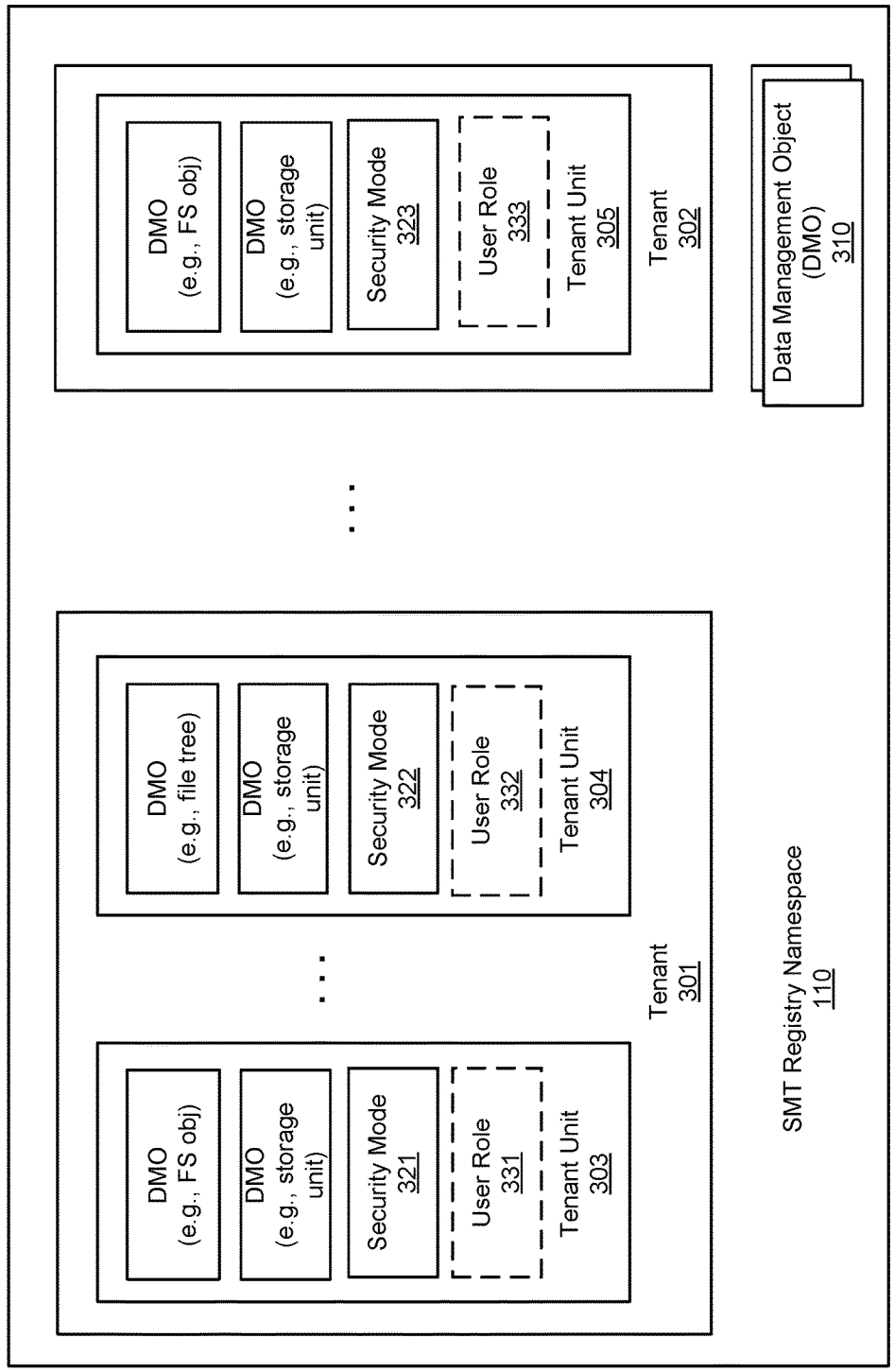
FIG. 3 is a block diagram illustrating an example of an SMT registry namespace according to one embodiment of the invention.

FIG. 3 is a block diagram illustrating an example of an SMT registry namespace according to one embodiment of the invention. Referring to FIG. 3, in this example, SMT registry namespace 110 includes multiple tenants 301-302. Each of tenants 301-302 may include one or more tenant-units. In this example, tenant 301 includes tenant-units 301-302, while tenant 302 include tenant-unit 305. Each of tenant-units 303-305 may include one or more data management objects (DMOs) representing storage resources associated with the tenant-unit. A data management object can be a file system management object having directory information of a directory of one or more files. A data management object can describe one or more storage units assigned to a tenant-unit. A data management object can be associated with a user object, which may be further associated with a tenant-unit of a tenant. The user object is further described by detailed information such as user role. Some data management objects such as data management objects 310 may not be associated with any tenant-unit or any tenant. Some data management objects may be associated with a tenant-unit, but not associated with a tenant. DMOs are not associated with a tenant directly. DMOs are associated with a tenant-unit directly. Through tenant-units association with a tenant, DMOs may be indirectly associated with a tenant. A data management operation described above may create, remove, or modify any of the data management objects, which may cause an update to be performed to SMT registry namespace cache 205.

According to one embodiment, some of tenant-units 303-305 may specify a security mode, either being a default security mode or a strict security mode, in this example, security modes 321-323. Further, some of tenant-units 303-305 may optionally specify a user with a role indicating that the user will be a tenant administrator for that particular tenant-unit, in this example, user roles 331-333. In some cases, a user may be obtained from an identity source or identity provider server (e.g., LDAP server).

FIG. 4 is a block diagram illustrating an example of an SMT registry namespace cache according to one embodiment of the invention. Referring to FIG. 4, SMT registry namespace cache 205 may be built and/or updated from SMT registry namespace 110 of FIG. 3. Note that in this example, although SMT registry namespace cache 205 has been shown in a mapping table, however, it can also be implemented in a variety of data structures. In one embodiment, SMT registry namespace cache 205 includes multiple entries, each entry corresponds to a tenant unit, including tenant unit ID 401, security mode 402 for the tenant unit identified by tenant unit ID 401, and other information 403. Security mode 402 can be set to either a default or strict security mode. Security mode 402 can be used to determine whether a data management operation can be authorized by a particular user of a particular user role.

FIG. 5 is a block diagram illustrating an example of authorization rules according to one embodiment of the invention. Table or rules 500 may represent at least a portion of AUTH rules 220 of FIG. 2. For the purpose of illustration, table 500 combines both system administrator rules 221 and tenant administrator rules 222 in a form of mapping table. However, other forms of data structures may also be utilized. Note that a "security mode" here refers to a security mode representation representing a combination of a source security mode of a source tenant-unit associated with a source DMO and a destination security mode of a destination tenant-unit associated with a destination DMO. A security mode is referred to as a default mode only if both the source and destination security modes are default modes. If one or both of source and destination security modes are strict modes, the security mode referred to herein is a strict mode.

Referring to FIG. 5, in one embodiment, rule 501 refers to a situation or scenario in which none of the source DMO and destination DMO is associated with any tenant-unit in the storage system (e.g., DMOs 310 of FIG. 3). In this situation, if the user is a system administrator, the data management operation will be allowed, regardless of the security modes of the source and destination DMOs. The security mode is not applicable here, because in general a security mode is specified within a tenant-unit. Since the DMOs are not associated with any tenant-unit, no security mode is specified. If the user is a tenant administrator (e.g., a tenant administrator role for both source tenant and destination tenant), the data management operation will be denied regardless of the security mode settings, because the DMOs are not associated with a tenant-unit of which the user is a tenant administrator.

Rule 502 refers to a scenario in which one DMO belongs to a tenant-unit (but the tenant-unit is not associated with a tenant), while the other DMO does not belong to any tenant-unit. If the security mode is a default security mode and the user is a system administrator, the data management operation will be allowed, with an optional warning message sent to a predetermined entity. If the security mode is a strict mode, the data management operation will be denied. As described above, a strict security mode can be set only if the corresponding tenant-unit belongs to a specific tenant. If the user is a tenant administrator and the security mode is a default mode or strict mode, the data management operation will be denied, because one of the DMOs does not exist for a specific tenant-unit of which the user is a tenant administrator.

Rule 503 refers to a scenario in which both DMOs belong to the same tenant-unit, but the tenant-unit does not belong to any tenant. If the security mode is a default mode, the data management operation will be allowed with a warning sent to a monitoring entity, regardless of the user role. If the security mode is a strict security mode, the data management operation will be denied, since the tenant-unit does not belong to a tenant and a strict security mode can only be applied to a tenant-unit.

Rule 504 refers to a scenario in which one DMO (e.g., source DMO) belongs to a first tenant-unit and the other DMO (e.g., destination DMO) belongs to a second tenant-unit, but none of the first and second tenant-units belongs to any tenant. If the security mode is a default mode, the data management operation will be allowed with a warning regardless of the user role. If the security mode is a strict mode, the data management operation will be denied regardless the user role, since none of the first and second tenant units belongs to a tenant.

Rule 505 refers to a scenario in which one DMO belongs to a first tenant-unit which belongs to a first tenant, while the other DMO does not belong to any tenant-unit. If the security mode is a default mode and the user is a system administrator, the data management operation will be allowed with a warning. If the security mode is a strict mode and the user is a system administrator, the data management operation will be denied, because one of the tenant-units does not belong to any tenant while the other one belongs to a tenant. That is, for a strict security mode, both DMOs/tenant-units must belong to the same tenant in order to authorize a data management operation. If the user is a tenant administrator, the data management operation will be denied regardless of the security mode, because both DMOs do not belong to the same tenant.

Rule 506 refers to a scenario in which one DMO belongs to a first tenant-unit which belongs to a first tenant, while the other DMO belongs to a second tenant-unit, but the second tenant-unit does not belongs to any tenant. If the security mode is a default mode, the data management operation will be allowed with a warning, regardless of the user role. If the security mode is a strict mode, the data management operation will be denied, because both DMOs do not belong to the same tenant.

Rule 507 refers to a scenario in which one DMO belongs to a first tenant-unit and the other DMO belongs to a second tenant-unit. Both the first and the second tenant-units belong to the same tenant. In this situation, the data management operation will be allowed regardless of the security mode and user role, because both DMOs belong to the same tenant. Rule 508 refers to a scenario in which one DMO belongs to a first tenant-unit and the other DMO belongs to a second tenant-unit. Both the first and the second tenant-units belong to different tenants. In this situation, the data management operation will be denied regardless of the security mode, because both DMOs belong to different tenants. Other rules may also be implemented.

FIG. 6 is a flow diagram illustrating a process for authorizing data management operations according to one embodiment of the invention. Process 600 may be performed by processing logic that includes hardware (e.g. circuitry, dedicated logic, etc.), software (e.g., embodied on a non-transitory computer readable medium), or a combination thereof. For example, process 600 may be performed by system 200. Referring to FIG. 6, at block 601, processing logic receives a request from a remote device of a user to perform a data management operation from source data represented by a source DMO to destination data represented by a destination DMO. At block 602, processing logic determines a first or source security mode associated with the source DMO and a second or destination security mode associated with the destination DMO. At block 603, processing logic determines whether a user role of the user is a system administrator of the storage system or a tenant administrator of one of the tenants hosted by the storage system. If the user is a system administrator, at block 604, processing logic authorizes the request for data management operation based on the first and second security modes using a first set of AUTH rules associated with a system administrator. If the user role is a tenant administrator, at block 605, processing logic authorizes the request for data management operation based on the first and second security modes using a second set of AUTH rules associated with a tenant administrator.

Figure 7:
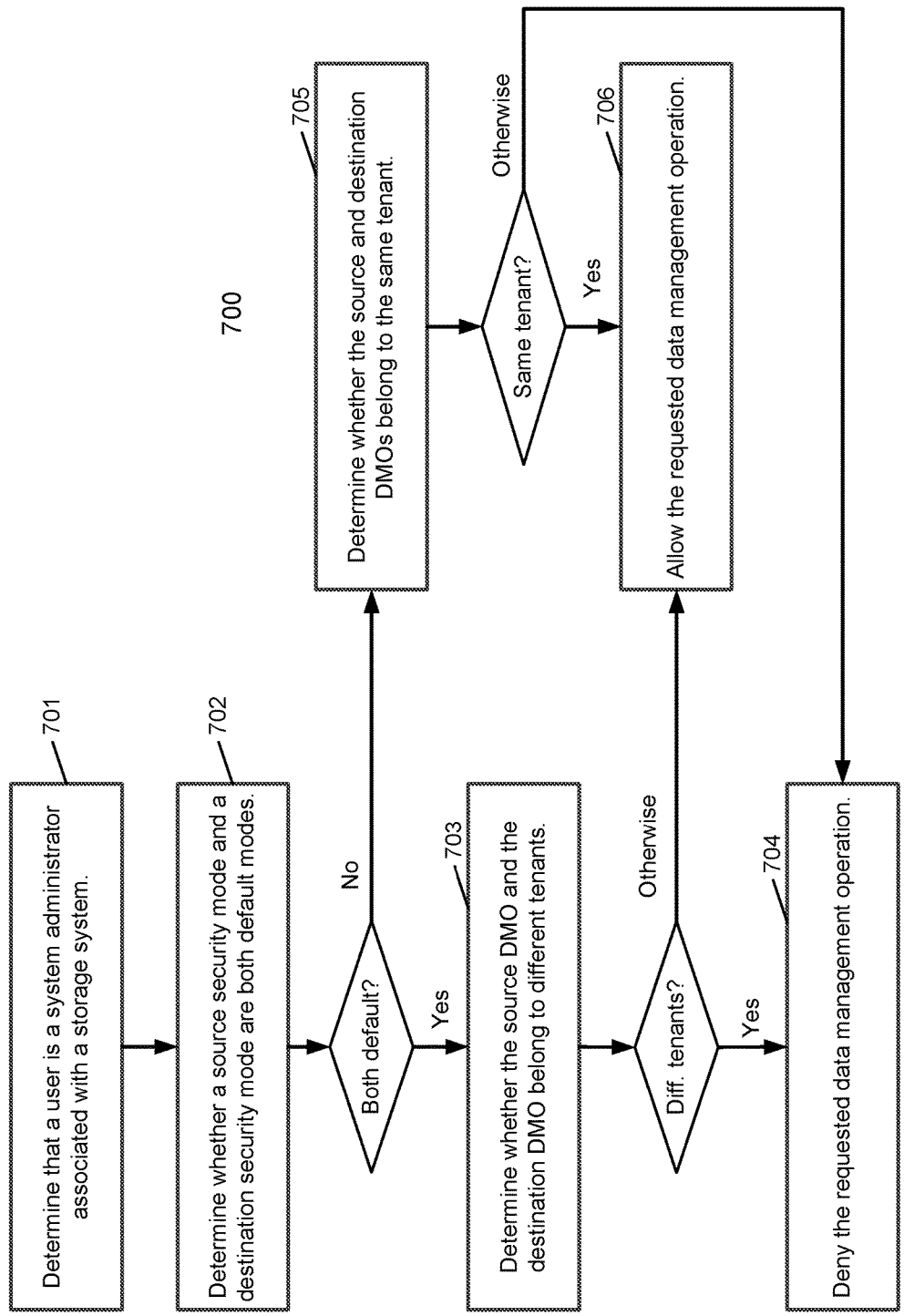
FIG. 7 is a flow diagram illustrating a process for authorizing data management operations according to another embodiment of the invention.

FIG. 7 is a flow diagram illustrating a process for authorizing data management operations according to another embodiment of the invention. Process 700 may be performed by processing logic that includes hardware (e.g. circuitry, dedicated logic, etc.), software (e.g., embodied on a non-transitory computer readable medium), or a combination thereof. For example, process 700 may be performed by system 200. Referring to FIG. 7, at block 701, it is determined that a user who requested a data management operation from a source DMO to a destination DMO is a system administrator. At block 702, processing logic determines whether a source security mode of the source DMO and the destination security mode of the destination DMO are both default modes. If the source and destination security modes are default modes, at block 703, processing logic determines whether the source DMO and the destination DMO belong to different tenants. That is, processing logic determines whether each of the source DMO and the destination DMO is specifically associated with a tenant-unit of a specific tenant.

If it is determined that the source DMO and the destination DMO are associated with different specific tenants, at block 704, the request for performing a data management operation is denied. Otherwise, at block 706, the request is allowed, in which case either both source and destination DMOs belong to the same specified tenant, or at least one of the DMOs does not belong to any tenant. If at least one of the source and destination security modes is a strict mode, at block 705, processing logic determines whether both the source and destination DMOs belong to the same tenant. If both the source and destination DMOs belong to the same tenants (e.g., specific tenant), at block 706, the request for performing the data management operation is allowed. Otherwise, at block 704, the request is denied, in which case, either the source DMO or destination DMO belongs to different tenants, or at least one of the source and destination DMOs does not belong to any tenant.

Figure 8:
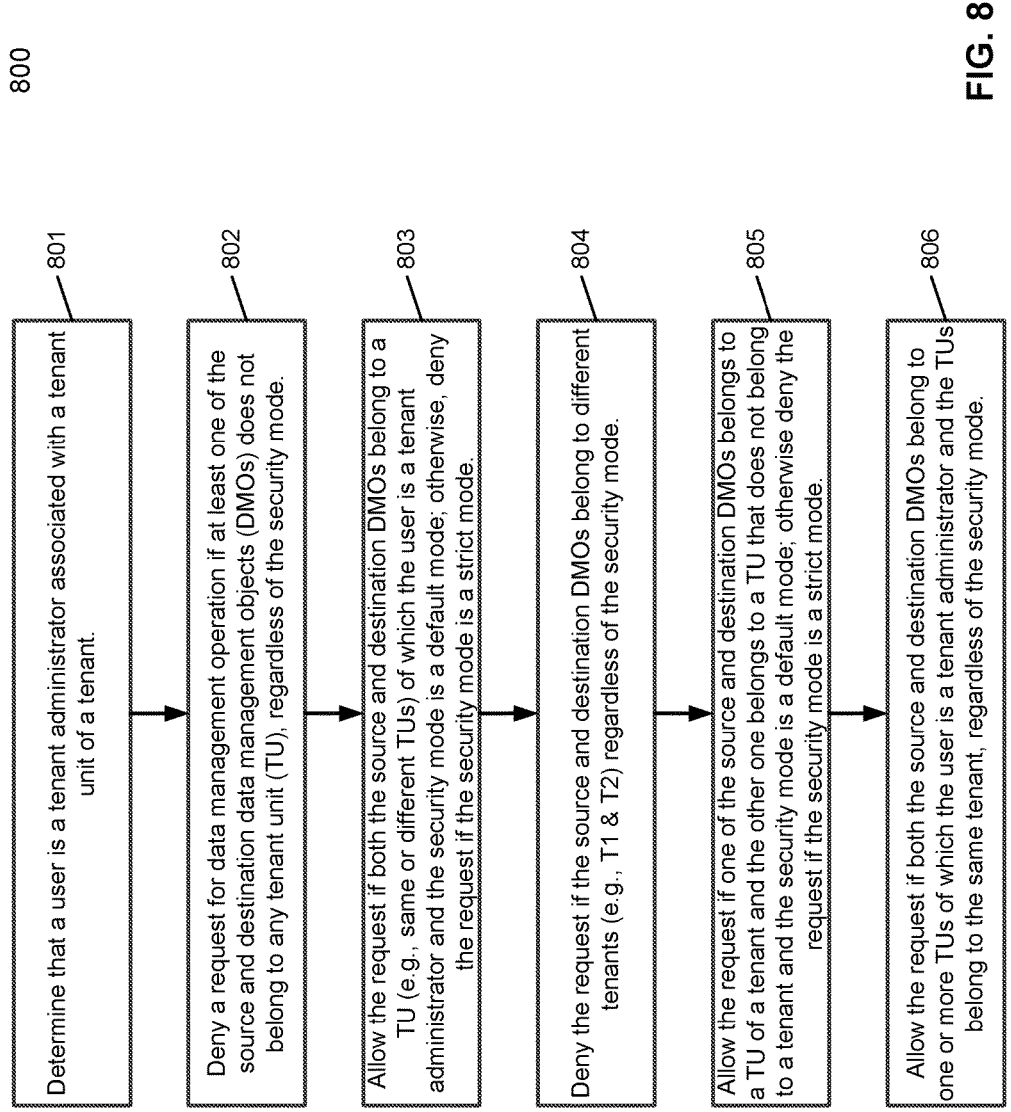
FIG. 8 is a flow diagram illustrating a process for authorizing data management operations according to another embodiment of the invention.

FIG. 8 is a flow diagram illustrating a process for authorizing data management operations according to another embodiment of the invention. Process 800 may be performed by processing logic that includes hardware (e.g. circuitry, dedicated logic, etc.), software (e.g., embodied on a non-transitory computer readable medium), or a combination thereof. For example, process 800 may be performed by system 200. Referring to FIG. 8, at block 801, processing logic determines that a user is a tenant administrator associated with a tenant-unit of a tenant. The user requested to perform a data management operation from a source DMO to a destination DMO. At block 802, the request is denied if at least one of the source and destination DMOs does not belong to any tenant-unit, regardless of the security mode (e.g., default or strict mode). That is, a user can only perform a data management operation on a DMO of a specific tenant of which the user is a tenant administrator. At block 803, the request is allowed if both the source and destination DMOs belong to a tenant-unit (e.g., same or different tenant-units, but not associated with a tenant) of which the user is a tenant administrator and the security mode is a default mode. Otherwise, the request is denied if the security mode is a strict mode. At block 804, the request is denied if the source and destination DMOs are associated with different tenants regardless of the security mode. At block 805, the request is allowed if one of the DMOs belongs to a tenant-unit of a tenant and the other one belongs to a tenant-unit that does not belong to any tenant, and the security mode is a default mode; otherwise, the request is denied if the security mode is a strict mode. At block 806, the request is allowed if both DMOs belong to different tenant-units and both tenant-units belong to the same tenant, regardless of the security mode.

Figure 9:
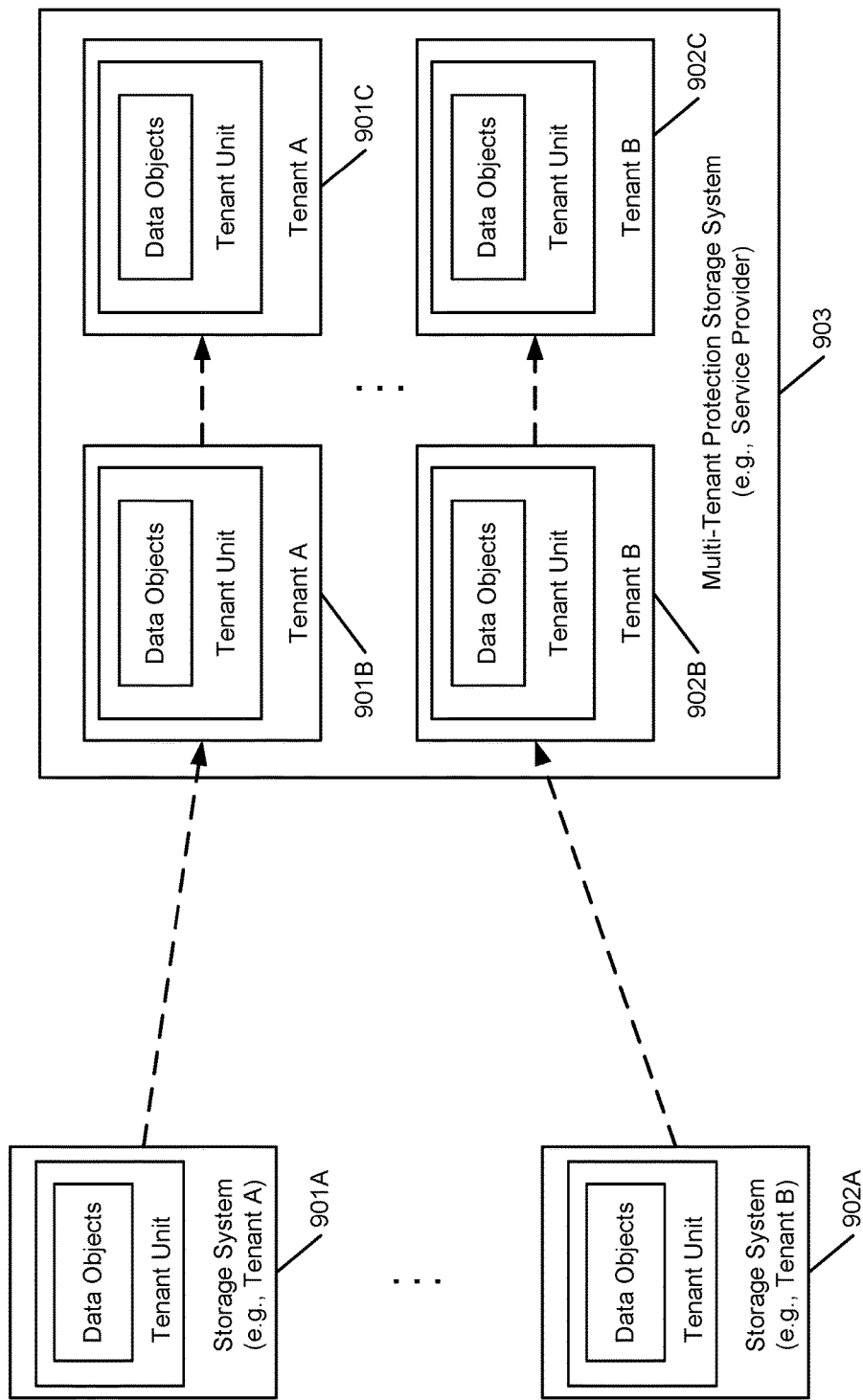
FIG. 9 is a block diagram illustrating a process for authorizing data management operations according to another embodiment of the invention.

The techniques of authentication and/or authorization based on security modes can be utilized in certain situations where some of the DMOs are associated with specific tenant-units or tenants, and some of the DMOs are not associated with any tenant-unit or tenant. For example, as shown in FIG. 9, tenants 901A and 902A have their own storage systems and the data objects stored in storage systems 901A and 902A may not associated with any tenant-unit or any tenant, since storage systems 901A-902A are single tenant system. The data management operations are typically allowed to be performed within the same storage system.

On the other hand, storage system 903 is a multi-tenant storage system, which may be provided by a storage service provider that provides storage services to tenants 901A and 902A (e.g., backup, restoration, disaster recovery, etc.). The data objects stored in storage system 903 are associated with specific tenants. Thus the security modes of tenant units of tenants 901B-901C and 902B-902C may be set to a strict mode. However, if the security mode in tenant 901B is set to strict, the data management operation from storage system 901A to 901B may not be performed properly, since data objects in storage system 901A do not belong to any tenant. In that situation, a default security mode would allow such data management operation to be performed. In this situation, it needs to "relax" the restriction by setting to a default security mode.

Note that some or all of the components as shown and described above (e.g., SMT engine or module 115, access control module 116 of FIG. 1A) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
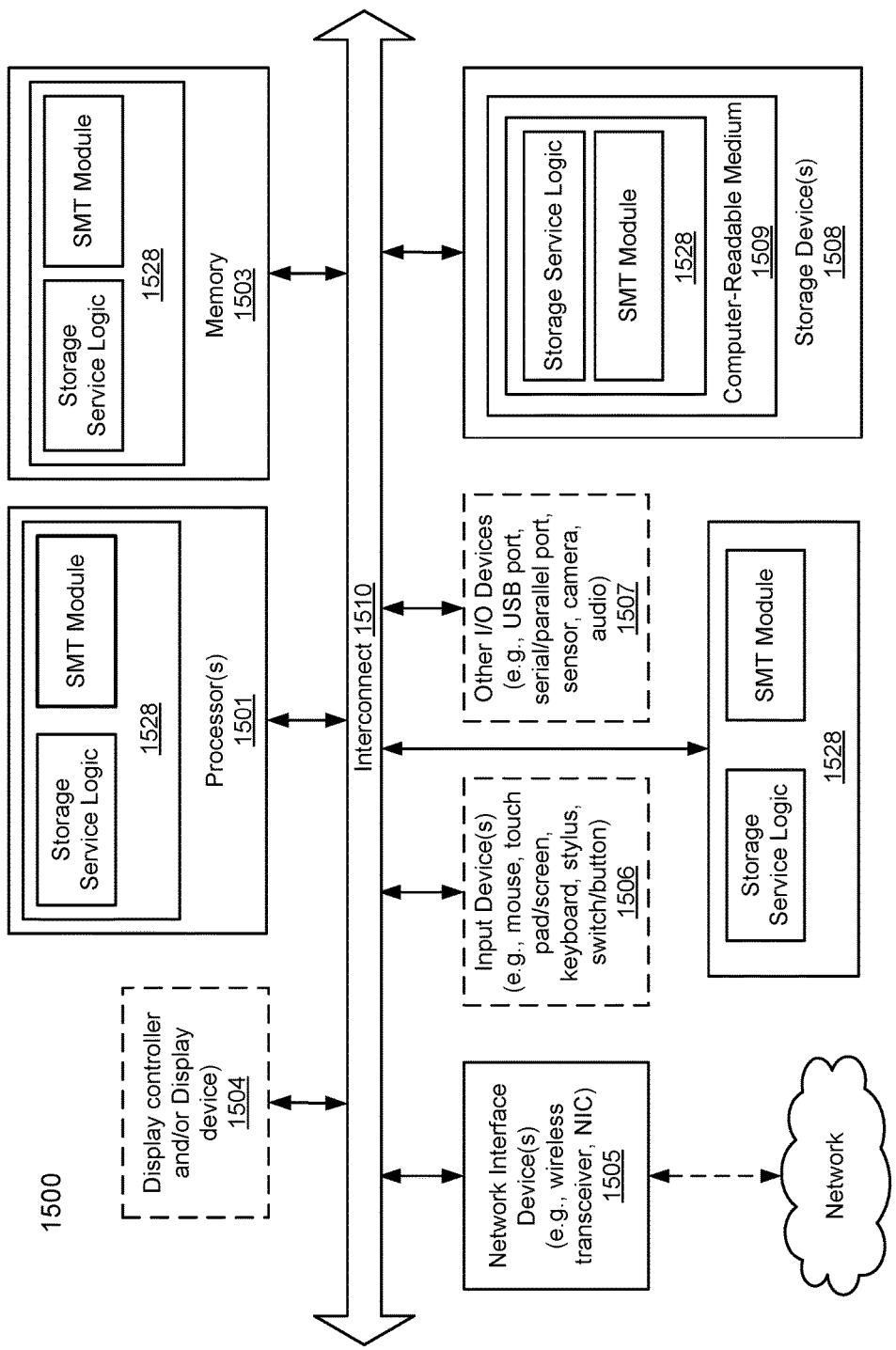
FIG. 10 is a block diagram illustrating a data processing system according to one embodiment.

FIG. 10 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for authorizing data management operations of a multi-tenant protection storage system, the method comprising:
receiving a request from a remote device of a user for performing a data management operation from source data represented by a source data management object (DMO) to destination data represented by a destination DMO;
determining a first security mode associated with a source tenant-unit corresponding to the source DMO and a second security mode associated with a destination tenant-unit corresponding to the destination DMO;
determining whether the user is a system administrator for a storage system corresponding to the source data or the destination data, and whether the user is a tenant administrator for a tenant associated with the source data or the destination data; and
determining whether the data management operation should be allowed based on the first and second security modes, using a first set of authorization rules corresponding to the system administrator, in response to determining that the user is a system administrator, wherein determining whether the data management operation should be allowed using the first set of authorization rules corresponding to the system administrator comprises:
determining whether the first and second security modes are default security modes,
if one of the first and second security modes is a strict mode, determining whether the source and destination DMOs belong to an identical tenant,
allowing the request for performing the data management operation if the source and destination DMOs belong to the same tenant, and
otherwise denying the request for performing the data management operation.

2. The method of claim 1, wherein determining whether the data management operation should be allowed using the first set of authorization rules corresponding to the system administrator comprises:
determining whether any of the first DMO and the second DMO belongs to a tenant-unit; and
allowing the request for performing the data operation if none of the first and second DMOs belongs to a tenant-unit.

3. The method of claim 1, wherein if both the first and second security modes are default modes, the method further comprises:
determining whether the source DMO and the destination DMO belong to different tenants;
denying the request for performing the data management operation if the source DMO and the destination DMO belong to different tenants; and
otherwise allowing the request for performing the data management operation.

4. The method of claim 1, further comprising determining whether the data management operation should be allowed based on the first and second security modes, using a second set of authorization rules corresponding to the tenant administrator, in response to determining that the user is a tenant administrator.

5. The method of claim 4, further comprising denying the request for performing the data operation if at least one of the source and destination DMOs does not belong to a tenant-unit.

6. The method of claim 4, further comprising allowing the request for performing the data operation if both the source and destination DMOs belong to a tenant-unit of which the user is a tenant administrator.

7. The method of claim 4, further comprising:
determining that one of the source DMO and destination DMO belongs to a tenant-unit of a tenant and the other one does not belong to any tenant;
allowing the request for performing the data management operation if both first and second security modes are default modes; and
otherwise denying the request for performing the data management operation.

8. The method of claim 4, further comprising allowing the request for performing the data operation if the source DMO belongs to a first tenant-unit, the destination DMO belongs to a second tenant-unit, and the first and second tenant-units belong to an identical tenant.

9. A non-transitory machine-readable medium having instructions stored therein, which when executed by a processor, cause the processor to perform operations of configuring tenants of a multi-tenant storage system, the operations comprising:

receiving a request from a remote device of a user for performing a data management operation from source data represented by a source data management object (DMO) to destination data represented by a destination DMO;

determining a first security mode associated with a source tenant-unit corresponding to the source DMO and a second security mode associated with a destination tenant-unit corresponding to the destination DMO;

determining whether the user is a system administrator for a storage system corresponding to the source data or the destination data, and whether the user is a tenant administrator for a tenant associated with the source data or the destination data; and determining whether the data management operation should be allowed based on the first and second security modes, using a first set of authorization rules corresponding to the system administrator, in response to determining that the user is a system administrator, wherein determining whether the data management operation should be allowed using the first set of authorization rules corresponding to the system administrator comprises:

determining whether the first and second security modes are default security modes, if one of the first and second security modes is a strict mode, determining whether the source and destination DMOs belong to an identical tenant, allowing the request for performing the data management operation if the source and destination DMOs belong to the same tenant, and otherwise denying the request for performing the data management operation.

10. The non-transitory machine-readable medium of claim 9, wherein determining whether the data management operation should be allowed using the first set of authorization rules corresponding to the system administrator comprises:

determining whether any of the first DMO and the second DMO belongs to a tenant-unit; and allowing the request for performing the data operation if none of the first and second DMOs belongs to a tenant-unit.

11. The non-transitory machine-readable medium of claim 9, wherein if both the first and second security modes are default modes, the operations further comprise:

determining whether the source DMO and the destination DMO belong to different tenants;

denying the request for performing the data management operation if the source DMO and the destination DMO belong to different tenants; and otherwise allowing the request for performing the data management operation.

12. The non-transitory machine-readable medium of claim 9, wherein the operations further comprise determining whether the data management operation should be allowed based on the first and second security modes, using a second set of authorization rules corresponding to the tenant administrator, in response to determining that the user is a tenant administrator.

13. The non-transitory machine-readable medium of claim 12, wherein the operations further comprise denying the request for performing the data operation if at least one of the source and destination DMOs does not belong to a tenant-unit.

14. The non-transitory machine-readable medium of claim 12, wherein the operations further comprise allowing the request for performing the data operation if both the source and destination DMOs belong to a tenant-unit of which the user is a tenant administrator.

15. The non-transitory machine-readable medium of claim 12, wherein the operations further comprise:

determining that one of the source DMO and destination DMO belongs to a tenant-unit of a tenant and the other one does not belong to any tenant;

allowing the request for performing the data management operation if both first and second security modes are default modes; and otherwise denying the request for performing the data management operation.

16. The non-transitory machine-readable medium of claim 12, wherein the operations further comprise allowing the request for performing the data operation if the source DMO belongs to a first tenant-unit, the destination DMO belongs to a second tenant-unit, and the first and second tenant-units belong to an identical tenant.

17. A data processing system, comprising:

a processor; and a memory coupled to the processor storing instructions, which when executed by the processor, cause the processor to perform operations, the operations including receiving a request from a remote device of a user for performing a data management operation from source data represented by a source data management object (DMO) to destination data represented by a destination DMO, determining a first security mode associated with a source tenant-unit corresponding to the source DMO and a second security mode associated with a destination tenant-unit corresponding to the destination DMO, determining whether the user is a system administrator for a storage system corresponding to the source data or the destination data, and whether the user is a tenant administrator for a tenant associated with the source data or the destination data, and determining whether the data management operation should be allowed based on the first and second security modes, using a first set of authorization rules corresponding to the system administrator, in response to determining that the user is a system administrator, wherein determining whether the data management operation should be allowed using the first set of authorization rules corresponding to the system administrator comprises:

determining whether the first and second security modes are default security modes, if one of the first and second security modes is a strict mode, determining whether the source and destination DMOs belong to an identical tenant, allowing the request for performing the data management operation if the source and destination DMOs belong to the same tenant, and otherwise denying the request for performing the data management operation.

18. The system of claim 17, wherein determining whether the data management operation should be allowed using the first set of authorization rules corresponding to the system administrator comprises:
   determining whether any of the first DMO and the second DMO belongs to a tenant-unit; and
   allowing the request for performing the data operation if none of the first and second DMOs belongs to a tenant-unit.

19. The system of claim 17, wherein if both the first and second security modes are default modes, the operations further comprise:
   determining whether the source DMO and the destination DMO belong to different tenants;
   denying the request for performing the data management operation if the source DMO and the destination DMO belong to different tenants; and
   otherwise allowing the request for performing the data management operation.

20. The system of claim 17, wherein the operations further comprise processing the request for performing the data management operation based on the first and second security modes, using a second set of authorization rules corresponding to the tenant administrator, in response to determining that the user is a tenant administrator.

21. The system of claim 20, wherein the operations further comprise denying the request for performing the data operation if at least one of the source and destination DMOs does not belong to a tenant-unit.

22. The system of claim 20, wherein the operations further comprise allowing the request for performing the data operation if both the source and destination DMOs belong to a tenant-unit of which the user is a tenant administrator.

23. The system of claim 20 wherein the operations further comprise:
   determining that one of the source DMO and destination DMO belongs to a tenant-unit of a tenant and the other one does not belong to any tenant;
   allowing the request for performing the data management operation if both first and second security modes are default modes; and
   otherwise denying the request for performing the data management operation.

24. The system of claim 20, wherein the operations further comprise allowing the request for performing the data operation if the source DMO belongs to a first tenant-unit, the destination DMO belongs to a second tenant-unit, and the first and second tenant-units belong to an identical tenant.

* * * * *